United States Patent Office 3,245,719
Patented Apr. 12, 1966

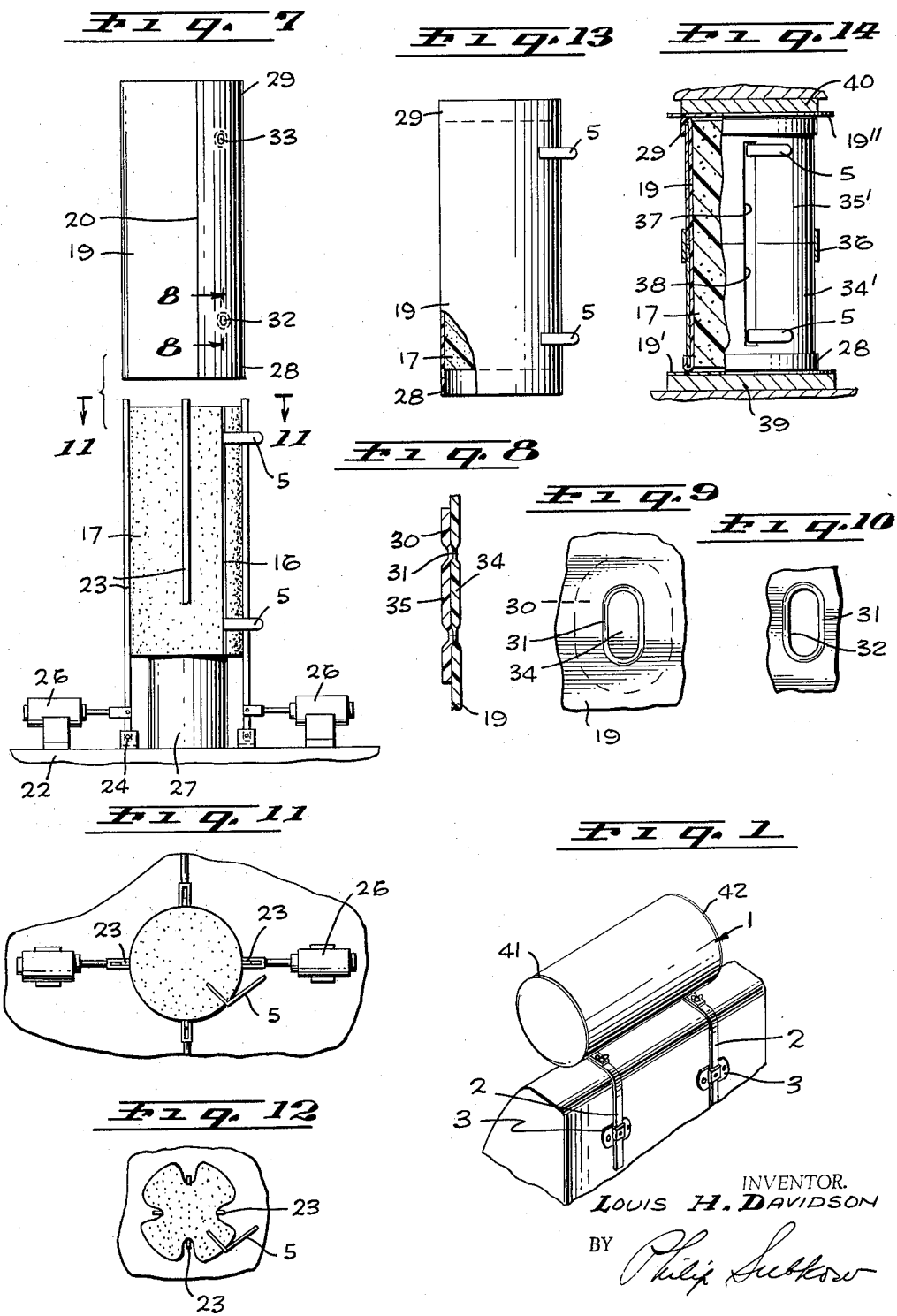

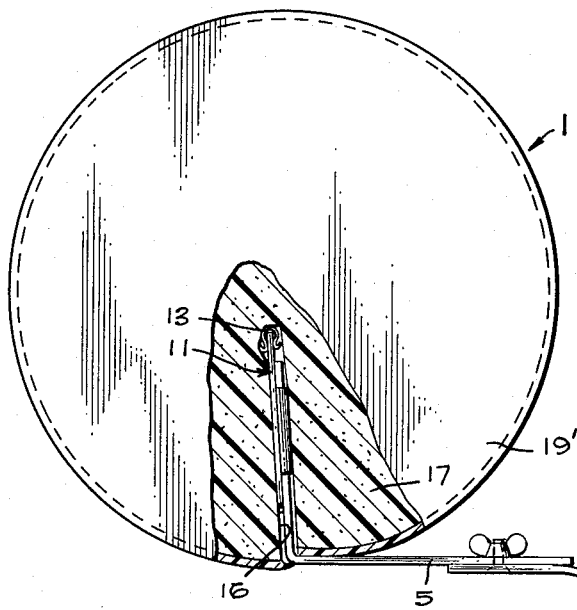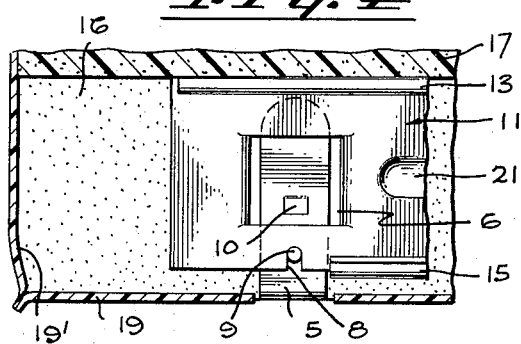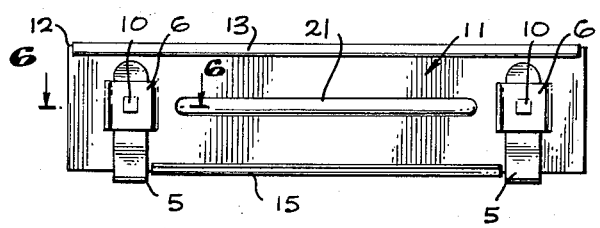

3,245,719
HEAD REST
Louis H. Davidson, Beverly Hills, Calif.
(7765 Lemona Ave., Van Nuys, Calif.)
Filed Aug. 13, 1964, Ser. No. 389,398
4 Claims. (Cl. 297—397)

This invention relates to improvements in the construction of head rests and to methods of manufacture of head rests.

One form of head rest now available and particularly suitable for installation on automobile seats consists of a cylindrical member filled with a cushioning material, such as foam rubber or other plastic foam, encased in a sleeve and carrying brackets for mounting the cylinder at the top of the seat, usually by attachment to the back thereof.

This invention relates to such a head rest and has for its object to modify the design and select materials used so as to make the head rest adjustable. It is a particular object of my invention to design the head rest and select the materials employed therein so as to simplify the construction and reduce the labor required to assemble the unit.

The economic cost of assembly of prior art units, as I have found, is the labor required to mount the brackets and to encase the cushioning material in its casing. I have accomplished a drastic reduction in the man-hours required to assemble head rests by the design of the head rest of my invention and by the methods of assembly of my invention and have also produced a head rest simpler in construction and of superior design.

These objectives I have attained by employing the following expedients:

(1) I employ a cylinder of some foam material, such as foam rubber or polyurethane foam, or other plastic foams, and provide in the cylinder a longitudinal slit, preferably parallel to the cylindrical axis, and extending to a depth substantially equal to and preferably somewhat deeper than the width of the plate inserted therein, as described below.

In the preferred embodiment illustrated in the attached drawing, for reasons explained below, the slit extends to the end of the cylinder to form the casing.

(2) A plate having a length shorter than the slot and a width somewhat narrower than the slot and carrying short brackets, extending perpendicular to the plate, and having means for securing the brackets to the plate, is inserted in the slot. In the preferred embodiment illustrated in the drawings, the longitudinal edges of the plate are cushioned for the reason explained below.

(3) A heat-sealable plastic sleeve, in the preferred embodiment, illustrated in the drawings, and as is described below, the sleeve is formed by heat-sealing a rectangle of heat-sealable plastic at the opposite longitudinal edges of the plastic sheet, to form a cylindrical sleeve with a longitudinal heat-sealed seam, carrying separate slots aligned to permit the passage of the brackets, said slots being longitudinally spaced from each other and circumferentially spaced from said longitudinal seam. It is mounted over the assembly under (2), with the brackets protruding through the slots in the sleeve.

(4) End covers for the foam cylinder and cylindrical sleeve are attached to the sleeve by heat-sealing the periphery of the covers to the cylindrical edges of the sleeve.

(5) Extension brackets may be attached to the brackets mounted on the plate, for mounting the unit on the seat.

The above construction permits of employing an assembly method which reduces the labor costs. The following features contribute to this improved assembly method.

(A) Both the plates and the brackets may be mounted in the foam cylinder before the sleeve is mounted.

(B) The foam cylinder may be compressed manually, or preferably by a power tool, so that the diameter of the foam cylinder is reduced to permit the formed open end of the sleeve to be passed over the compressed foam cylinder, the sleeve has sufficient elasticity, when the cylinder is compressed, to pass the slots in the sleeve over the brackets so that the brackets protrude through the slots, which are in registry therewith.

(C) The sleeve extends beyond each end of the foam cylinder. The sleeve is folded back to give a cuff at each end of the sleeve, and the foam cylinder is packed down to provide for the mounting of the ends of the sleeve.

(D) The end covers, which extend beyond the periphery of the sleeve, are heat sealed to the folded-back edge at both ends, and the excess cut away.

These objectives and procedures are facilitated by using power actuated tools, but they may, with additional cost of labor, be performed by hand, using hand tools.

This invention will be further described by reference to the drawings, which illustrate a preferred embodiment of my invention:

FIG. 1 is a perspective view of the head rest of my invention mounted on a seat;
FIG. 2 is an end view with parts broken away;
FIG. 3 is an enlarged, fragmentary view of FIG. 2;
FIG. 4 is a section taken on line 4—4 of FIG. 3;
FIG. 5 is a plan view of the plate assembly;
FIG. 6 is a section on line 6—6 of FIG. 5;
FIG. 7 is an exploded view of an assembly for mounting the sleeve;
FIG. 8 is a section on line 8—8 of FIG. 7;
FIG. 9 is a fragmentary view of the knockout slots shown in FIG. 8;
FIG. 10 shows the open slot;
FIG. 11 is a view on line 11—11 of FIG. 7;
FIG. 12 shows a cylinder in compressed condition prior to the mounting of the sleeve;
FIG. 13 shows the sleeve mounted on the foam cylinder; and
FIG. 14 shows the assembly ready for attachment of the end covers.

The head rest 1 assembly shown in FIGS. 1 and 2 is mounted on the right-angle bracket arms 2, and the bracket receivers 3, which are attached to the back of the seat or chair, and carry the knurled set screws 4 for adjustment of the height of the head rest. The right angle brackets 5 are mounted in plate 11 in the up-set slot 6, having a detent 7 and a locating notch 8. The brackets 5 carry pins 9, positioned in notches 8, and dimples 10, which nest in the detents 7. The plate 1 has a reinforcing longitudinal up-set groove 21, extending the length of the plate 11 between the slots, to increase the rigidity of the plate. The longitudinal edge 12 is covered with a plastic longitudinal bead 13, extending substantially the entire length of the edge 12. A similar bead 15 is mounted on the other longitudinal edge and extends between the brackets 5. The plate 11 is mounted midway of the slot 16, which extends the length of the foam cylinder 17 from end to end. The slot is of depth to receive the plate with the bend of the bracket 5 at the cylinder surface, The sleeve 19, which is formed by a heat-sealed joint 20, carrying the ends 19', heat sealed to the circular ends of the sleeve 19, encases the foam cylinder without any substantial compaction of the foam.

To assemble the unit, I first mount the brackets 5 in the slots 6 and enter the pins 9 in the slots 8, with the dimples 10 engaging the detents 7. To aid in the secure attachment of the bracket arms 5 to the plate 11, I deform the edges of the slots 8 at the pins 9 to create in interference against removal. Any other suitable attachment of the brackets 5 to the plate 11, such as by welding, may be employed. I prefer the described construction, since it is cheaper and assures the correct location of the brackets 5 in the plate 11.

The plate is then entered midway into the slot 16, and the assembly is mounted in the structure shown in FIG. 7. This unit is formed of a base 22, on which are mounted four rods 23, spaced 90° apart, and pivoted at one end at pivots 24, mounted on base 22, and free at their upper ends. A platform 27 is mounted centrally of the assembly. The distance between the rods, spaced 180° apart, is somewhat greater than the diameter of the cylinder 17. The foam cylinder 17, carrying the plate 11 and brackets 5, is mounted on the platform 27, the brackets being between the adjacent rods. The pneumatic cylinders 26 are actuated to advance the piston rods 25, to angularly deflect the rods 23. The rod lengths are so designed that the compression of the cylinder throughout its length reduces the diameter of the foam cylinder to the degree necessary to mount the sleeve 17, as will be described below. As is shown in FIG. 13, the sleeve is of greater length than in FIG. 1, to the degree of extension of the ends 28 and 29 beyond the dotted line showing the ends of the cylinder. The sleeve is formed by heat-sealing a strip of heat sealable plastic along the uninterrupted seal line 20.

The plastic on its reverse side carries a small plate 30 at the two slot locations and is heat-sealed by means of a shaped die at 31 to attach the plate 30 to the reverse side of the sleeve 19 along a circumambient seal 31. This construction permits of the easy removal of the discs 34 and 35 and leaves a reinforced groove formed by the edge seal 31 between the sleeve 19 and the plate 34. The slots 32 and 33 are spaced at a distance equal to the spacing of the brackets 5 and are of length somewhat more than the width of the brackets 5. The slots 32 and 33 are separated longitudinally of the sleeve and are circumferentially spaced from the seal, line 20.

The sleeve 19 is then mounted over the compressed foam cylinder 17. The degree of compression and the limited elasticity of the plastic material of 17, and the length of the protrusion of the brackets 5, are so designed that the sleeve may be drawn over the rods and over protruding brackets 5. The upper bracket 5 is entered through the slot 33. This locates the lower bracket 5 so that, when the upper bracket 5 has entered 33, the lower bracket 5 is in registry with the lower slot 32, and the sleeve may be drawn over the lower bracket 5 and the lower bracket 5 entered into the lower slot 32.

The pressure in the cylinders 26 is vented, and the rods return to their original vertical position, with the foam cylinder expanded to fit snugly in the sleeve 18 to the extent permitted by the thickness of the rods. The ends 29 and 30 extending beyond the ends of the foam cylinder 8, as is shown in FIG. 13. The cylinder and sleeve may then be withdrawn from the rods 23. The rod surfaces and the slight radial compression of the foam cylinder facilitating the easy withdrawal.

The encased assembly (see FIG. 13) is entered into a split mold (see FIG. 14) formed of two metallic thin walled cylinders 34' and 35', carrying centering lips 36. Cylinder 35' has a slot 37, terminating at its lower end, and the cylinder 34 has a slot 38 terminating at its upper end.

The cylinders are passed over each end of the assembly of FIG. 13, with the brackets 5 positioned within the slots 37 and 38. The ends 29 and 28 are folded back over the ends of the cylinders 34' and 35', to form the cuffs shown at 28 and 29. The distance between the ends of the cylinders 34' and 35' is somewhat less than the length of the foam cylinder 19.

The sheet of heat-sealable plastic, to form the end 19', is placed over a metallic plate 39, suitably supported, and the assembly shown in FIG. 13 is placed over the sheet 19, as is shown in FIG. 14. The foam cylinder is pushed down so that the top is at the end of the cylinder 35', and thus is longitudinally compressed to a minor degree, but sufficiently to permit the ends of the cylinder of foam to create a limited axial pressure on the ends 19' when the assembly is completed. The extension of the slot 16 to the ends of the foam cylinder 17 permits of the longitudinal compression of the foam cylinder.

A sheet of heat-sealable plastic 19", similar to 19', is placed over the top of the metallic cylinder 35', and a metallic plate 40 is placed over 19". The terminals of a dielectric heating unit are connected to 39 and 40, and pressure is applied by a press to hold the sheets 19" and 19' firmly against the cuffs 28 and 29, and to slightly compress the foam cylinder axially.

The plastics form the dielectric, and the current passes through the plates 40 and 39, and the cylinders 34' and 35', thus heating the die at the edges of the cylinder 34' and 35' adjacent 19" and 19', to produce a circular seal 41 and 42 between the sleeve 17 and the sheet 19" and 19' at the periphery of the ends of cylinders 34' and 35', and at the periphery cylindrical sleeve 7 and to the sheets 19" and 19'. The excess material of 19" and 19', i.e., the overlay shown in FIG. 14, and the excess material forming the cuffs 29 and 28, is easily stripped to give a circular edge, shown in FIG. 1.

The above procedure produces a snug fit of the sleeve and sleeve ends over the foam cylinder without any slack in the casing.

To mount the head rest, the brackets 2 are fitted and clamped into the holders 3, and the brackets 5 are connected to the brackets 6 by means of a wing nut and screw fitting into suitable provided bores in 2 and 5. The height of the head rest may be adjusted, as will be clear from the foregoing.

The snug fit of the foam cylinder in the casing prevents wrinkling of the casing and gives an added resistance to the head rest.

It will be observed from FIG. 2 that the force of a blow by the head against the head rest is directed substantially perpendicular to the plate and may have a tendency to cause the edge of the plate 12 to cut the plastic at the bottom of the slot 16 and the edge 14 to cut the plastic at the open end of the slot 16. The guard beads 13 and 15 at the longitudinal edges prevent the cutting of the foam by the edge 12 and 14.

While I have described particular embodiments of my invention for the purpose of illustration, it should be understood that various modifications and adaptations thereof may be made within the spirit of the invention, as set forth in the appended claims.

I claim:

1. A head rest comprising a foam cylinder, a longitudinal slot in said cylinder, a bracket plate in said slot, angular brackets connected to said bracket plate and extending from said cylinder, a casing for cylinder, said casing enclosing said cylinder and said bracket plate, said casing comprising a sleeve, a longitudinal uninterrupted heat-seal seam in said sleeve, said slots being longitudinally spaced and aligned and circumferentially spaced from said heat-sealed seam, slots in said sleeve, said brackets extending through said slots, said bracket plate extending from one of said angular brackets to the other of said angular brackets; a pair of end covers for said sleeve and said cylinder; a heat seal at the peripheral edges of said covers extending circumambiently about the ends of said sleeve; and said cylinder fitting snugly in said casing.

2. A head rest comprising a foam cylinder, a longitudinal slot in said cylinder, said slot extending from end to end of said cylinder, a bracket plate in said slot, spaced angular brackets connected to said bracket plate and extending from said cylinder, said bracket plate extending from one of said angular brackets to the other of said angular brackets, a casing for said cylinder, said casing comprising a sleeve, said sleeve extending around said cylinder and said bracket plate, a longitudinal uninterrupted heat seal seam in said sleeve, said slots being longitudinally spaced and aligned and circumferentially spaced from said heat-sealed seam, slots in said sleeve, brackets extending through said slots, a pair of end covers, a heat seal at the peripheral edges of said covers and at the ends of said sleeve, said heat seal extending circumambiently about the edges of said sleeve and said covers, said cylinder fitting snugly in said casing.

3. A head rest comprising a foam cylinder, a longitudinal slot in said cylinder, a bracket plate in said slot, said bracket plate having guard beads at the opposite longitudinal edges of said plate, angular brackets connected to said bracket plate and extending from said cylinder, said bracket plate extending from one of said angular brackets to the other of said angular brackets, a casing for said cylinder, said casing comprising a sleeve, said sleeve extending around said cylinder and bracket plate, a longitudinal heat-seal seam in said sleeve, spaced slots in said sleeve, brackets extending through said slots, a pair of end covers, a heat seal at the peripheral edges of said covers and at the ends of said sleeve, extending circumambiently about said sleeve ends and said edges of said covers, said cylinder fitting snugly in said casing.

4. A head rest comprising a foam cylinder, a longitudinal slot in said cylinder, said slot extending from end to end of said cylinder, a bracket plate in said slot, said bracket plate having edge beads on the opposite longitudinal edges of said plate, spaced angular brackets connected to said bracket plate and extending from said cylinder, said bracket plate extending from one of said angular brackets to the other of said angular brackets, a casing for said cylinder, said sleeve extending around said cylinder and bracket plate, said casing comprising a sleeve, a longitudinal heat seal seam in said sleeve, spaced slots in said sleeve, brackets extending through said slots, a pair of end covers, a heat seal at the peripheral edges of said covers and the ends of said sleeve, said seal extending circumambiently about said ends of said sleeve and said peripheral edges, said cylinder fitting snugly in said casing.

References Cited by the Examiner
UNITED STATES PATENTS

| | | | |
|---|---|---|---|
| 659,052 | 10/1900 | Crenshaw | 297—410 |
| 1,590,135 | 6/1926 | Upham | 29—91.1 |
| 1,935,485 | 11/1933 | Reynolds | 5—337 |
| 1,940,636 | 12/1933 | Stubnitz | 29—91.1 |
| 2,020,573 | 11/1935 | Pumphrey | 297—396 |
| 2,298,218 | 10/1942 | Madson | 5—337 |
| 2,765,840 | 10/1956 | Robert et al. | 297—410 |
| 2,865,434 | 12/1958 | Grenz | 297—408 |
| 3,017,221 | 1/1962 | Emey | 5—337 |
| 3,029,107 | 4/1962 | Myers | 297—399 |
| 3,042,450 | 7/1962 | Standley | 297—399 |

FOREIGN PATENTS

| | | |
|---|---|---|
| 806,774 | 7/1957 | Great Britain. |

FRANK B. SHERRY, *Primary Examiner.*

C. A. NUNBERG, *Assistant Examiner.*